US011252400B2

(12) United States Patent
Kim et al.

(10) Patent No.: US 11,252,400 B2
(45) Date of Patent: Feb. 15, 2022

(54) METHOD, DEVICE, AND RECORDING MEDIUM FOR PROCESSING IMAGE

(71) Applicants: Samsung Electronics Co., Ltd., Suwon-si (KR); RESEARCH & BUSINESS FOUNDATION SUNGKYUNKWAN UNIVERSITY, Suwon-si (KR)

(72) Inventors: Jungbum Kim, Suwon-si (KR); Sungkil Lee, Suwon-si (KR); Sangjun Ahn, Suwon-si (KR); Yuna Jeong, Suwon-si (KR); Sooryum Choi, Suwon-si (KR); Yuri Roh, Seoul (KR); Soyoung Park, Suwon-si (KR); Yoonji Choi, Suwon-si (KR)

(73) Assignees: Samsung Electronics Co., Ltd., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 16/758,305

(22) PCT Filed: Nov. 20, 2018

(86) PCT No.: PCT/KR2018/014249
§ 371 (c)(1),
(2) Date: Apr. 22, 2020

(87) PCT Pub. No.: WO2019/103427
PCT Pub. Date: May 31, 2019

(65) Prior Publication Data
US 2020/0322596 A1     Oct. 8, 2020

(30) Foreign Application Priority Data
Nov. 23, 2017   (KR) .................. 10-2017-0157505

(51) Int. Cl.
*G06T 5/00*      (2006.01)
*H04N 13/383*    (2018.01)
*G06F 3/01*      (2006.01)

(52) U.S. Cl.
CPC .......... *H04N 13/383* (2018.05); *G06F 3/013* (2013.01); *G06T 5/003* (2013.01)

(58) Field of Classification Search
CPC ......... G06T 5/003; G06K 9/40; H04N 13/383
See application file for complete search history.

(56) References Cited

U.S. PATENT DOCUMENTS

2006/0044241 A1*  3/2006  Yuh-Ren ............... G09G 3/3648
                                                    345/89
2008/0095400 A1*  4/2008  Nagano .............. H04N 5/23258
                                                    382/103
(Continued)

FOREIGN PATENT DOCUMENTS

JP        8-130664 A    5/1996
KR  10-2005-0079387 A   8/2005
(Continued)

OTHER PUBLICATIONS

International Search Report dated Mar. 14, 2019 issued in International Application No. PCT/KR2018/014249.
(Continued)

*Primary Examiner* — Yi Yang
(74) *Attorney, Agent, or Firm* — Jefferson IP Law, LLP

(57) ABSTRACT

Disclosed is a method, performed by a device, of processing an image, the method including: for an original image at a particular time point among a plurality of original images having a sequential relationship in terms of time, determining a cumulative value due to an afterimage of another original image before the particular time point; based on the determined cumulative value and the plurality of original images, obtaining a plurality of blur compensation images
(Continued)

for removing a blur caused by the afterimage; and outputting the obtained plurality of blur compensation images.

11 Claims, 8 Drawing Sheets

(56) References Cited

U.S. PATENT DOCUMENTS

| | | |
|---|---|---|
| 2012/0206500 A1 | 8/2012 | Koprowski et al. |
| 2013/0016239 A1* | 1/2013 | Cho ............... H04N 5/23277 |
| | | 348/208.4 |
| 2015/0346817 A1* | 12/2015 | Gallo ................... G09G 5/02 |
| | | 345/619 |
| 2016/0293086 A1* | 10/2016 | Zhang ................ G09G 3/3611 |
| 2016/0344956 A1* | 11/2016 | Takado ............... H04N 5/3597 |
| 2017/0053456 A1 | 2/2017 | Cho et al. |

FOREIGN PATENT DOCUMENTS

| | | |
|---|---|---|
| KR | 10-0578855 B1 | 5/2006 |
| KR | 10-0996036 B1 | 11/2010 |
| KR | 10-2012-0093794 A | 8/2012 |
| KR | 10-2016-0092670 A | 8/2016 |
| KR | 10-2017-0022088 A | 3/2017 |
| KR | 10-1839617 B1 | 3/2018 |

OTHER PUBLICATIONS

Korean Office Action dated Jan. 25, 2021, issued in Korean Application No. 2017-0157505.

\* cited by examiner

FIG. 1
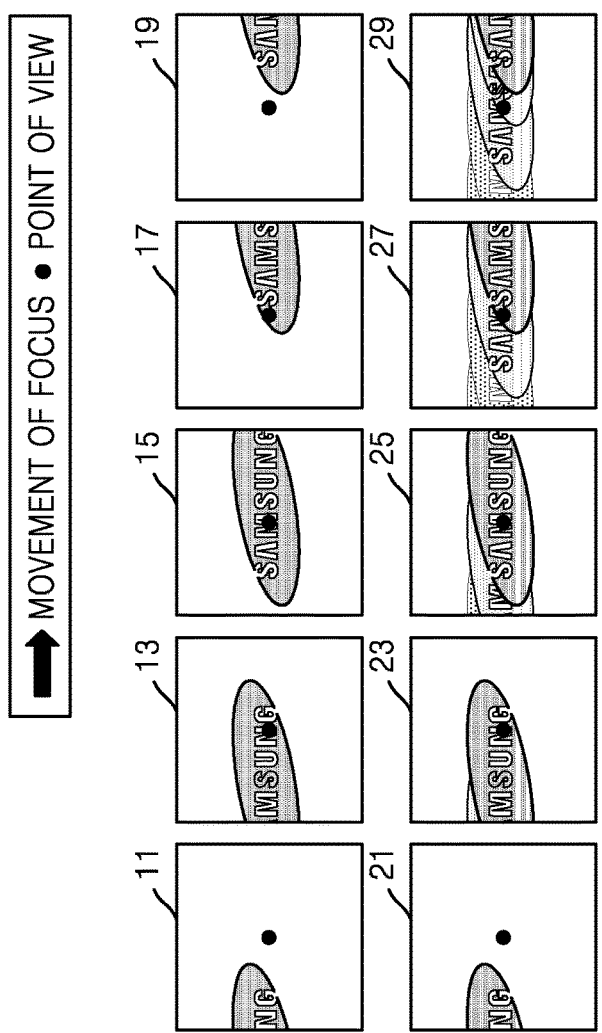
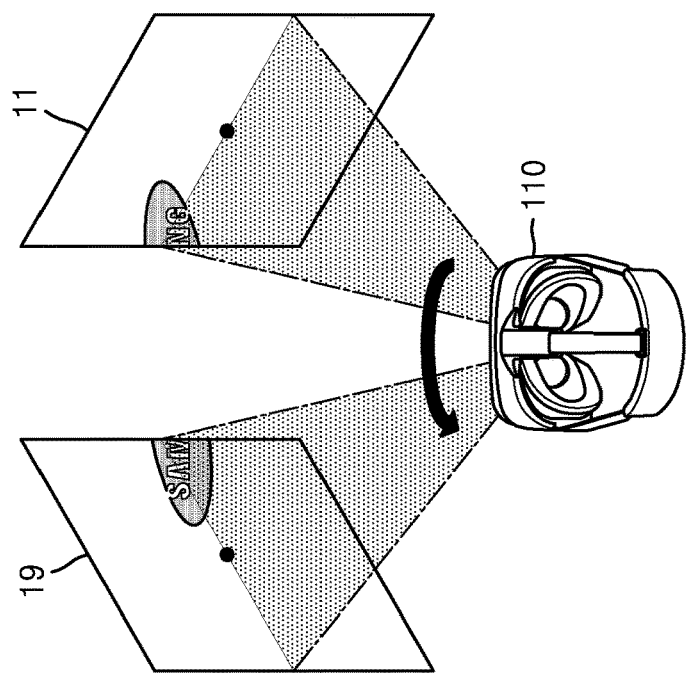

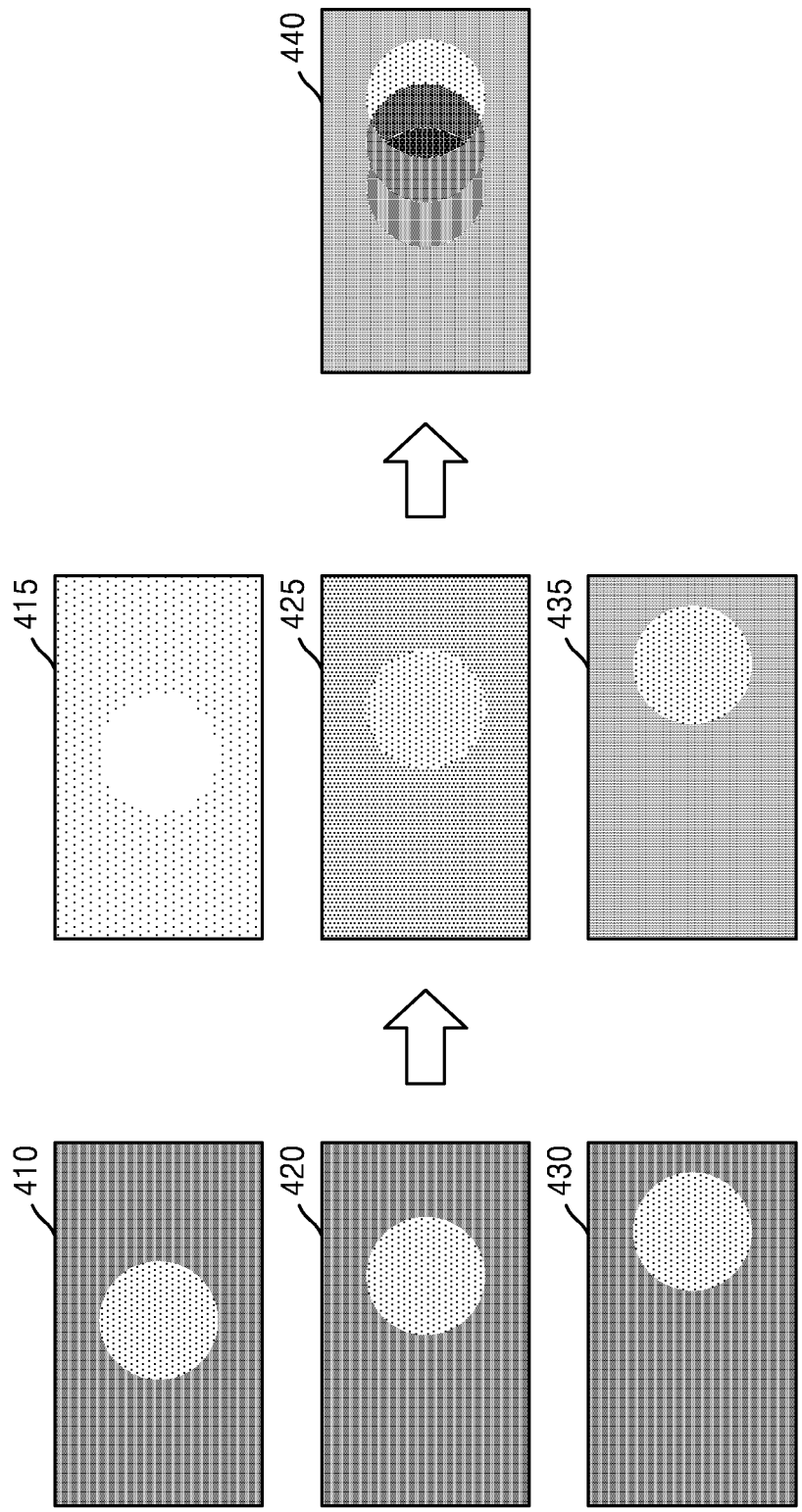

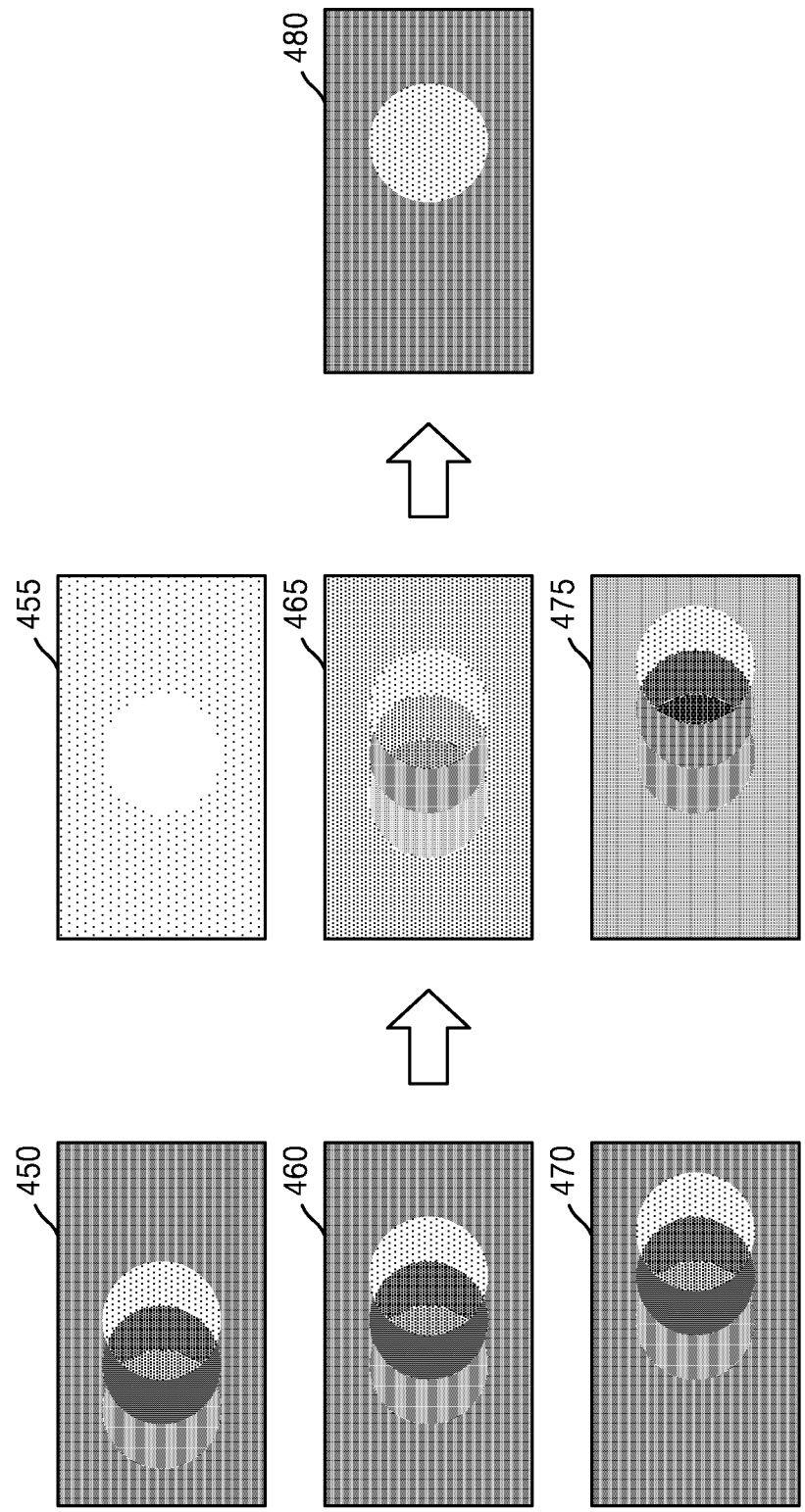

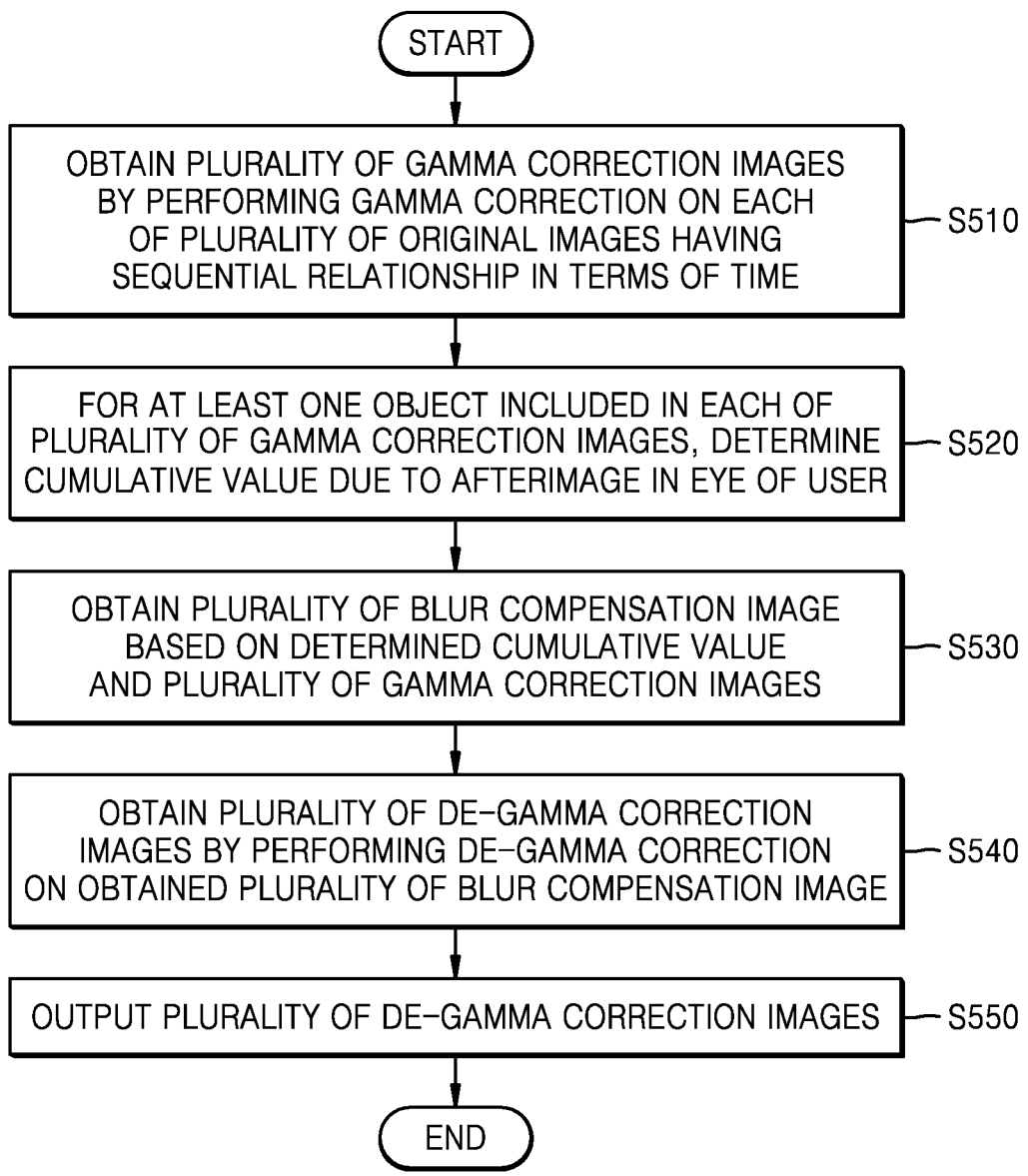

METHOD, DEVICE, AND RECORDING MEDIUM FOR PROCESSING IMAGE

TECHNICAL FIELD

The present disclosure relates to a method of processing an image, a device for processing an image, and a recording medium on which a program for performing the method of processing an image is recorded.

BACKGROUND ART

Recently, various techniques for providing images allowing users to experience virtual reality (abbreviated to VR hereinafter) have been developed. These virtual reality experience techniques may be implemented, for example, through devices such as head mount displays (HMDs) or the like, which allow users to experience virtual reality by distorting output images through lenses according to fields of view of the users.

In devices providing virtual reality, in research into improving the quality of output images, various deblurring techniques for removing motion blur have been studied. In particular, according to the related art, deblurring techniques, by which motion blur is removed by considering trajectories along which cameras have moved, time for which cameras or objects have moved, or the like, have been studied. However, because existing deblurring techniques do not consider motion blur generated due to perception characteristics of humans, there is a need to conduct research to solve this issue.

DESCRIPTION OF EMBODIMENTS

Solution to Problem

Provided are a method, a device, and a recording medium for processing an image such that motion blur due to an afterimage is removed by predicting and calculating a cumulative value of the afterimage generated due to perceptual characteristics of a user and by processing the image based thereon.

Disclosed is a method, performed by a device, of processing an image, the method including: for an original image at a particular time point among a plurality of original images having a sequential relationship in terms of time, determining a cumulative value due to an afterimage of another original image before the particular time point; based on the determined cumulative value and the plurality of original images, obtaining a plurality of blur compensation images for removing a blur caused by the afterimage; and outputting the obtained plurality of blur compensation images.

BRIEF DESCRIPTION OF DRAWINGS

FIG. 1 is a diagram illustrating motion blur caused by an afterimage in an eye of a user when a device outputs an image.

FIGS. 4A and 4B are diagrams illustrating images perceived by a user, when a device outputs an original image, and when the device outputs a blur compensation image, according to an embodiment.

FIG. 5 is a flowchart illustrating a method, performed by a device, of obtaining a blur compensation image for removing an afterimage of an image by performing gamma correction and de-gamma correction, according to an embodiment.

BEST MODE

Figure 2:
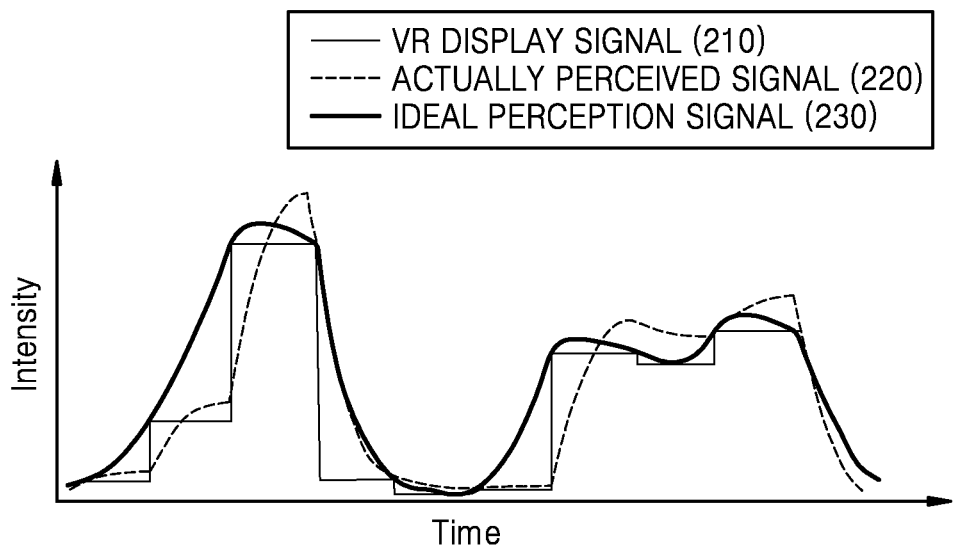
FIG. 2 is a graph illustrating a comparison of signals between an image distorted due to an afterimage and an actually output image, in a device.

According to an aspect of the present disclosure, a method, performed by a device, of processing an image may include: for an original image at a particular time point among a plurality of original images having a sequential relationship in terms of time, determining a cumulative value due to an afterimage of another original image before the particular time point; based on the determined cumulative value and the plurality of original images, obtaining a plurality of blur compensation images for removing a blur caused by the afterimage; and outputting the obtained plurality of blur compensation images.

According to an embodiment, in the method, performed by the device, of processing an image, the determining of the cumulative value may include determining the cumulative value, based on a value of at least one pixel, which constitutes the plurality of original images, and a blur kernel for the eye of a user.

According to an embodiment, in the method, performed by the device, of processing an image, the blur kernel may be determined based on a weight of each original image according to a response speed of visual cells of the user, when the original image at the particular time point overlaps the other original image before the particular time point.

According to an embodiment, in the method, performed by the device, of processing an image, the determining of the cumulative value may include determining the cumulative value representing the afterimage in the eye of a user, based on at least one of the movement of the head of the user wearing the device or a degree of change in at least one object included in each of the plurality of original images.

According to an embodiment, the method, performed by the device, of processing an image may further include tracking the movement of the eye of a user, and the determining of the cumulative value may include determining the cumulative value due to the afterimage of the other original image before the particular time point, based on a result of the tracking of the movement of the eye.

According to an embodiment, in the method, performed by the device, of processing an image, the plurality of blur compensation images may be obtained based on differences between the determined cumulative value and the plurality of original images.

According to an embodiment, the method, performed by the device, of processing an image may further include: obtaining a plurality of gamma correction images by performing gamma correction on each of the plurality of original images; and obtaining a plurality of de-gamma correction images by performing de-gamma correction on the obtained plurality of blur compensation images, and the determining of the cumulative value may include, for the plurality of gamma correction images, determining the cumulative value due to the afterimage.

According to another aspect of the present disclosure, a device for processing an image may include: a memory storing a plurality of original images having a sequential relationship in terms of time; at least one processor configured to, for an original image at a particular time point among the plurality of original images, determine a cumulative value due to an afterimage of another original image before the particular time point and, based on the determined cumulative value and the plurality of original images, obtain a plurality of blur compensation images for removing a blur caused by the afterimage; and an output unit outputting the obtained plurality of blur compensation images.

MODE OF DISCLOSURE

Terms used herein will be briefly described, and then, the present disclosure will be described in detail.

Although terms used herein are of among general terms which are currently and broadly used by considering functions in the present disclosure, these terms may vary according to intentions of those of ordinary skill in the art, precedents, the emergence of new technologies, or the like. In addition, there may be terms selected arbitrarily by the applicants in particular cases, and in these cases, the meaning of those terms will be described in detail in the corresponding portions of the detailed description. Therefore, the terms used herein should be defined based on the meaning thereof and descriptions made throughout the specification, rather than based on names simply called.

It will be understood that, throughout the specification, when a region such as an element, a component, a layer, or the like is referred to as "comprising" or "including" a component such as an element, a region, a layer, or the like, the region may further include another component in addition to the component rather than excludes the other component, unless otherwise stated. In addition, the term such as " . . . unit", " . . . portion", " . . . module", or the like used herein refers to a unit for processing at least one function or operation, and this may be implemented by hardware, software, or a combination of hardware and software.

Hereinafter, embodiments of the present disclosure will be described in detail with reference to the accompanying drawings, such that one of ordinary skill in the art is allowed to readily make implementations thereof. However, it should be understood that the present disclosure may be embodied in various different ways and is not limited to the following embodiments. In addition, portions irrelevant to the description are omitted from the drawings for clarity, and like components will be denoted by like reference numerals throughout the specification.

FIG. 1 is a diagram illustrating motion blur caused by an afterimage in the eye of a user when a device 100 outputs an image.

The device 100 may output a plurality of images 11, 13, 15, 17, and 19. Here, an image may be, for example, a frame. However, this is merely an example, and an image may denote a scene unit constituting content such as a moving image. In addition, an image that is output from the device 100 may be projected through a lens, thereby providing virtual reality that allows a user to feel like the image is output far away from the user.

Further, it is assumed that the plurality of images 11, 13, 15, 17, and 19 shown in FIG. 1 are output from the device 100 sequentially in time order. The device 100 may output the plurality of images 11, 13, 15, 17, and 19 sequentially from a first image 11 up to a fifth image 19, according to the movement of the eye of the user.

Due to perceptual characteristics of the eye of the user, an afterimage of a previous image with respect to a currently output image may affect the currently output image. For example, referring to FIG. 1, when the first image 11, which is a first-sequence image, is output, a first' image 21 recognized by the eye of the user may be the same as the first image 11. However, when the second image 13 is output from the device 100, a second' image 23, which is blurred due to an overlap between an afterimage of the first image 11 previously output and the second image 13, may be recognized by the eye of the user.

A third' image 25, a fourth' image 27, and a fifth' image 29 recognized by the eye of the user may also suffer from motion blur because the third image 15, the fourth image 17, and the fifth image 19 respectively overlap afterimages of previous images, as described above. In particular, because afterimages overlapping a current image increase as previously output images are accumulated, there is an issue of deterioration of image quality along with increasing motion blur occurring in an image.

Thus, the present disclosure intends to provide a method and a device for processing an image, the method and the device allowing deblurring of the image to be performed by removing an afterimage due to a previous image with respect to a currently reproduced image. This will be described below in more detail with reference to FIGS. 3 to 8.

FIG. 2 is a graph illustrating a comparison of signals between an image distorted due to an afterimage and an actually output image, in a device.

Regarding FIG. 2, a signal of an image actually output from a device will be described as a VR display signal 210, and a signal distortedly perceived by a user will be described as an actually perceived signal 220. In addition, to consider a compensation direction of the actually perceived signal 220, an ideal perception signal 230 will also be described in comparison with the VR display signal 210 and the actually perceived signal 220.

The VR display signal 210 output from the device may be distorted due to perceptual characteristics of the eye of the user. Referring to FIG. 2, for each range in which images having an equal intensity are continuously output from the device according to a sample and hold method, it can be confirmed that the intensity of a signal increases with being closer to an end of each range, due to accumulated afterimages. That is, it can be predicted that, when an image is output, the occurrence of motion blur becomes severer due to the accumulated afterimages.

To solve the phenomenon of motion blur, the present disclosure may provide an image processing method, in which compensation for motion blur is performed on the VR display signal 210 in advance such that the actually perceived signal 220 is allowed to correspond to the ideal perception signal 230 not suffering from motion blur. Hereinafter, a method, performed by the device, of removing motion blur caused by perceptual characteristics of the eye of the user will be described in detail.

Figure 3:
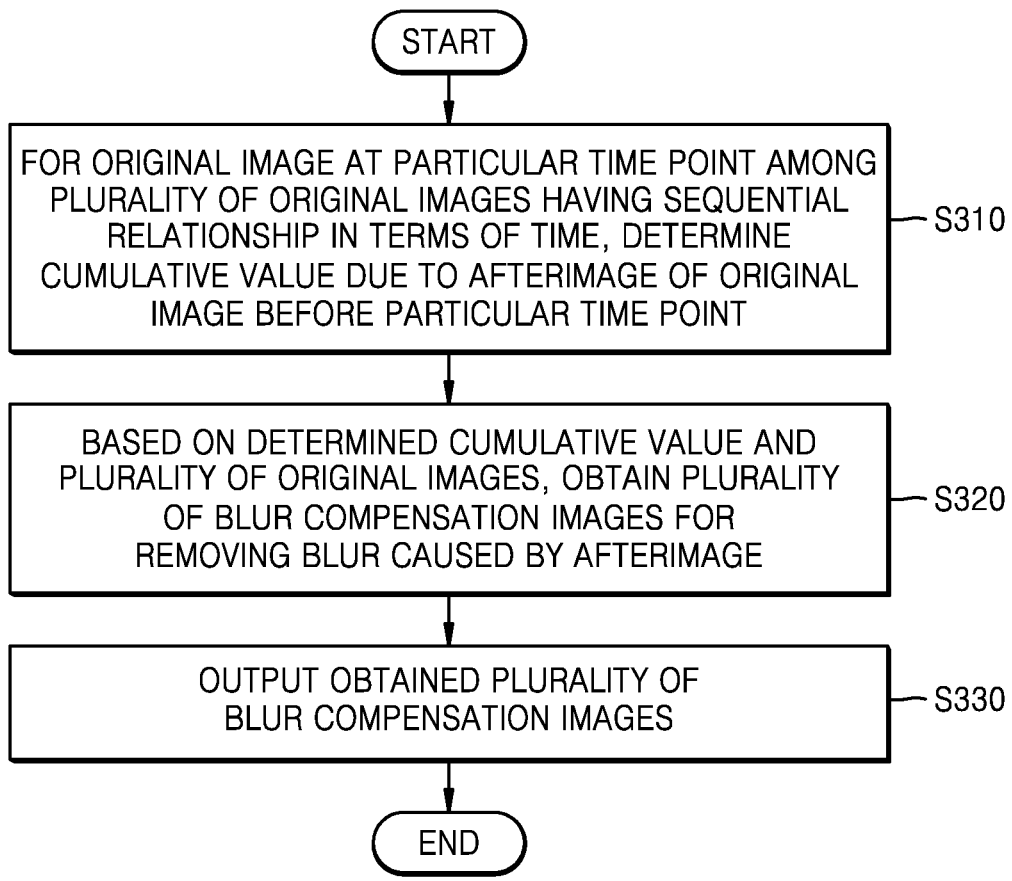
FIG. 3 is a flowchart illustrating a method, performed by a device, of processing an image, according to an embodiment.

FIG. 3 is a flowchart illustrating a method, performed by a device, of processing an image, according to an embodiment.

In operation S310, for an original image at a particular time point among a plurality of original images having a sequential relationship in terms of time, the device may determine a cumulative value due to an afterimage of an original image prior to the particular time point.

Herein, an afterimage represents an optical illusion by which, even after an image stimulating the eye disappears, the image remains in a field of view.

According to an embodiment, the cumulative value, which is generated due to an overlap between an original image at a current time point and an afterimage of an original image at a previous time point in the eye, may be determined by the following Equation 1, based on an original image and a blur kernel of the eye.

$$y^T = \begin{bmatrix} h_0 \\ h_1 \\ \vdots \\ h_{M-1} \end{bmatrix}^T \quad \text{Equation 1}$$

$$\begin{bmatrix} x_0 & x_1 & \cdots & x_{N-1} & 0 & 0 & 0 & \cdots & 0 \\ 0 & x_0 & x_1 & \cdots & x_{N-1} & 0 & 0 & \cdots & 0 \\ 0 & 0 & x_0 & x_1 & \cdots & x_{N-1} & 0 & \cdots & 0 \\ \vdots & \vdots & \vdots & \vdots & \cdots & \vdots & \vdots & \cdots & 0 \\ 0 & \cdots & 0 & 0 & x_0 & \cdots & x_{N-2} & x_{N-1} & \vdots \\ 0 & \cdots & 0 & 0 & 0 & x_0 & \cdots & x_{N-2} & x_{N-1} \end{bmatrix}$$

In Equation 1, y represents an image perceived by the eye, x represents the original image, and h represents the blur kernel of the eye. In addition, M represents the size of the blur kernel, and N represents the length of the image. Here, the blur kernel of the eye may be determined based on a weight of each original image according to a response speed of visual cells of a user when the original image at the particular time point overlaps another original image that is previously output.

In addition, Equation 1 set forth above may be simplified into the following Equation 2.

$$y_n = \sum_{i=0}^{M-1} h_i x_{n-i} \quad \text{Equation 2}$$

In operation S320, the device may obtain a plurality of blur compensation images for removing a blur caused by the afterimage, based on the determined cumulative value and the plurality of original images.

The device according to an embodiment may obtain the plurality of blur compensation images as a result of performing compensation such that the determined cumulative value corresponds to the plurality of original images. The plurality of original images may be represented based on the following Equation 3.

$$x_n = \sum_{i=0}^{M-1} h_i x_{n-i} \quad \text{Equation 3}$$

In Equation 3, x represents an original image, and h represents the blur kernel of the eye. In addition, M represents the size of the blur kernel, and N represents the length of the image. The device may obtain the blur compensation images by performing compensation such that the cumulative value according to Equation 2 corresponds to Equation 3. The following equation is Equation 4 representing the obtained blur compensation images.

$$J_n = \frac{x_n}{h_0} - \frac{1}{h_0} \sum_{i=1}^{M-1} h_i J_{n-i}$$

In Equation 4, x represents the original image, and h represents the blur kernel of the eye. In addition, M represents the size of the blur kernel, and N represents the length of the image.

In operation S330, the device may output the obtained plurality of blur compensation images.

The device according to an embodiment may output the plurality of blur compensation images sequentially in time order. Here, the order of the plurality of blur compensation images may be the same as the order of the plurality of original images.

The device may predict an afterimage in the eye of the user in advance and output the blur compensation image having undergone compensation for the afterimage, thereby effectively removing motion blur due to perceptual characteristics of the user.

The device according to an embodiment may be implemented in various forms. For example, the device described herein may include, but is not limited to, a cellular phone, a smart phone, a laptop computer, a tablet personal computer (PC), an electronic book terminal, a digital broadcasting terminal, a personal digital assistant (PDA), a portable multimedia player (PMP), a navigation system, a smart TV, a smart car, a consumer electronic (CE) machine (for example, a refrigerator, air conditioner, or the like having a display panel), a head mounted display (HMD), or the like.

FIGS. 4A and 4B are diagrams illustrating images perceived by a user, when a device outputs an original image, and when the device outputs a blur compensation image, according to an embodiment.

Referring to FIG. 4A, when the device outputs original images 410, 420, and 430 respectively corresponding to time points t−2, t−1, and t, a result of an overlap between the original image at each time point and an afterimage of a previous image may be recognized by the eye of the user.

For example, when it is assumed that a current time point is the time point t, a first original image 410, a second original image 420, and a third original image 430 may overlap each other while respectively having weights w1, w2, and w3, and thus, a result thereof may be recognized. Here, the weights w1, w2, and w3 may have greater values as a time point is closer to the current time point. Thus, a third recognized image 435, a second recognized image 425, and a first recognized image 415 may respectively have decreasing weights in this stated order.

As afterimages according to the first original image 410 and the second original image 420 overlap the third original image 430, the user may finally recognize a motion-blurred image 440.

Referring to FIG. 4B, to remove motion blur, the device may obtain a plurality of blur compensation images 450, 460, and 470, based on the plurality of original images 410, 420, and 430, which correspond to the time points t−2, t−1, and t described with reference to FIG. 4A, and the cumulative value due to the afterimages in the eye of the user. Specifically, the device may calculate the cumulative value by performing a linear discrete convolution on the plurality of original images 410, 420, and 430 and the blur kernel of the eye of the user.

In addition, the blur kernel of the eye may be estimated based on the movement of a head, changes between the plurality of original images 410, 420, and 430, or the like. Further, when an original image overlaps another original image that is previously output, the blur kernel of the eye may also be determined based on a weight of each original image according to a response speed of visual cells of the user.

When it is assumed that the current time point is the time point t, a first blur compensation image 450, a second blur compensation image 460, and a third blur compensation image 470 may overlap each other while respectively having the weights w1, w2, and w3, and thus, a result thereof may be recognized. In addition, a third' recognized image 455, a second' recognized image 465, and a first' recognized image 475 may respectively have decreasing values in this stated order.

When the device according to an embodiment sequentially outputs the first blur compensation image 450, the second blur compensation image 460, and the third blur compensation image 470, the afterimage of the previous image may be effectively processed, and thus, the user may recognize a final image 480 from which motion blur is removed.

FIG. 5 is a flowchart illustrating a method, performed by a device, of obtaining a blur compensation image for removing an afterimage of an image by performing gamma correction and de-gamma correction, according to an embodiment.

In operation S510, the device may obtain a plurality of gamma correction images by respectively performing gamma correction on a plurality of original images having a sequential relationship in terms of time.

The device according to an embodiment may perform gamma correction on the plurality of original images. The gamma correction refers to a process of encoding information in accordance with the nonlinearity of human vision. The human vision nonlinearly responds to brightness according to Weber's law. For this reason, when the brightness of light is linearly recorded, posterization may occur. Thus, to prevent the deterioration of image quality, the device may perform gamma correction for encoding information in accordance with the nonlinearity of human vision.

In operation S520, for each of the plurality of gamma correction images, the device may determine a cumulative value due to the afterimage in the eye of the user.

For example, the device may determine the cumulative value for each of the plurality of gamma correction images, based on Equation 1. Here, when a gamma correction image is input to x in Equation 1, the cumulative value for the gamma correction image may be determined.

In operation S530, the device may obtain a plurality of blur compensation images, based on the determined cumulative value and the plurality of gamma correction images.

The device according to an embodiment may obtain the plurality of blur compensation images as a result of performing compensation such that the determined cumulative value corresponds to the plurality of gamma correction images.

In operation S540, the device may obtain a plurality of de-gamma correction images by performing de-gamma correction on the obtained plurality of blur compensation images.

The device according to an embodiment may determine a de-gamma curve based on information about a gamma curve used for the gamma correction. For example, the device may obtain the de-gamma curve by taking a reciprocal of the gamma curve applied in operation S510.

In operation S550, the device may output the plurality of de-gamma correction images.

The device according to an embodiment may output the plurality of de-gamma correction images sequentially in time order. Here, the order of the plurality of de-gamma correction images may be the same as the order of the corresponding original images.

The device may predict an afterimage in the eye of the user in advance, and thus, the device may compensate for the afterimage and also perform gamma correction and de-gamma correction on an image, thereby effectively encoding information in accordance with the nonlinearity of the vision of the user.

Figure 6:
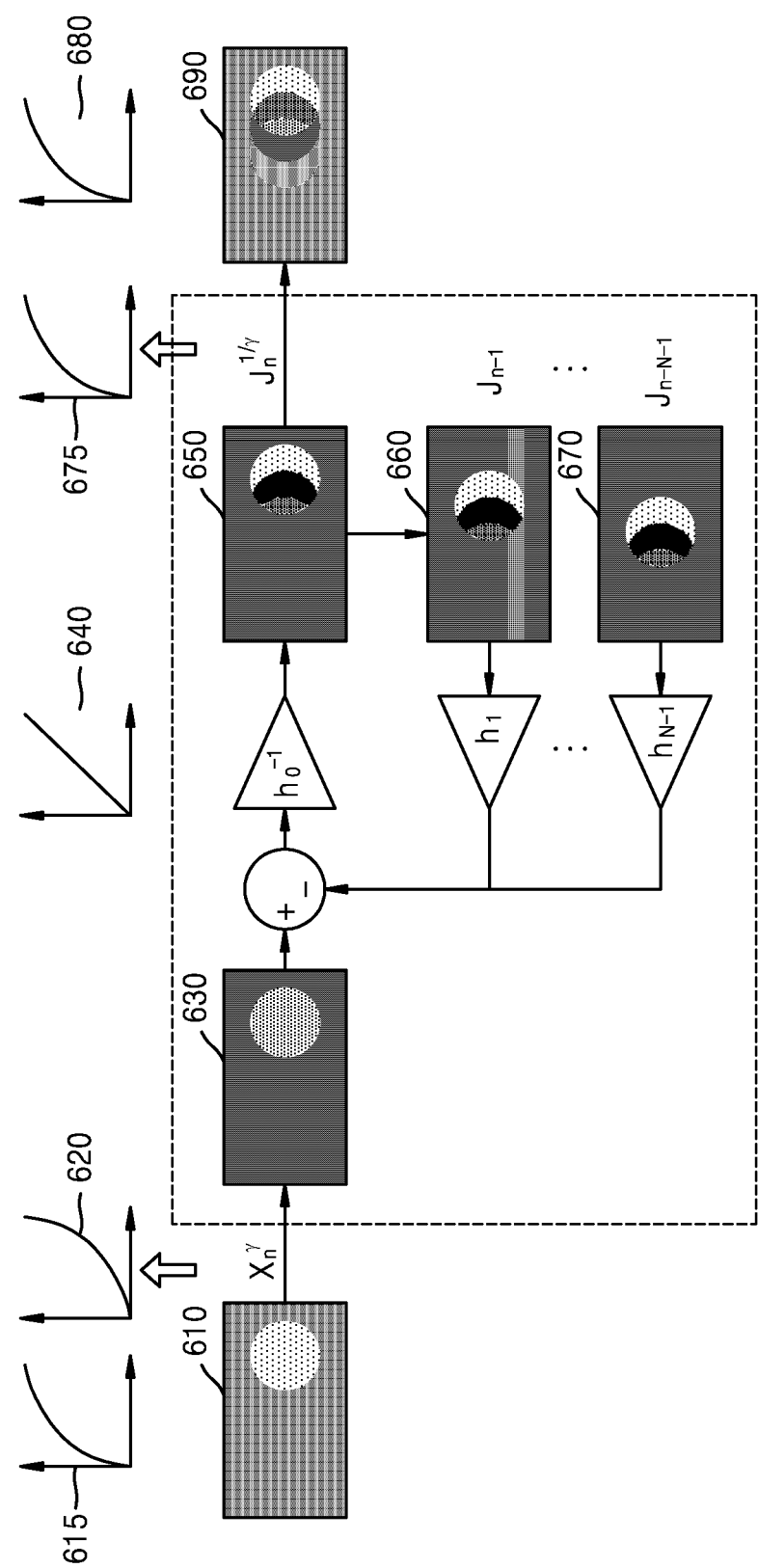
FIG. 6 is a diagram illustrating a method, performed by a device, of obtaining a blur compensation image for removing an afterimage of an image by performing gamma correction and de-gamma correction, according to an embodiment.

FIG. 6 is a diagram illustrating a method, performed by a device, of obtaining a blur compensation image for removing an afterimage of an image by performing gamma correction and de-gamma correction, according to an embodiment.

Referring to FIG. 6, the device may obtain original images having a sequential relationship in terms of time. The device may select an original image 610 as input data, that is, x.

To consider the nonlinearity 615 of the eye of a human, the device may perform gamma correction by applying a gamma curve 620 to the original image 610. In addition, the device may obtain a plurality of blur compensation images 650, 660, and 670 from a gamma correction image 630, which has undergone conversion into a linear type 640 according to the gamma correction, based on a cumulative value for a previous image.

Further, the device may obtain a de-gamma correction image 690, which has undergone conversion into a nonlinear type 680, by applying a de-gamma curve 675 to the obtained plurality of blur compensation images 650, 660, and 670.

As described above, the device may output a plurality of images, to which the gamma correction, the blur compensation, and the de-gamma correction have been sequentially applied in this stated order, thereby further improving the quality of the images.

Figure 7:
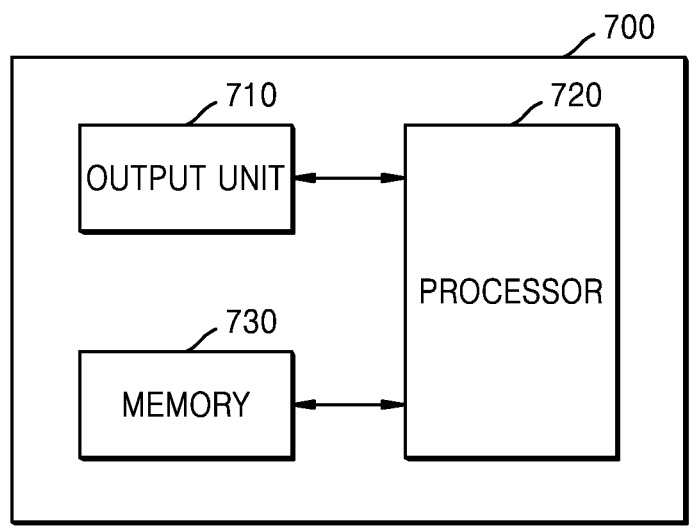
FIGS. 7 and 8 are each a block diagram of a device for processing an image, according to an embodiment.
Figure 8:
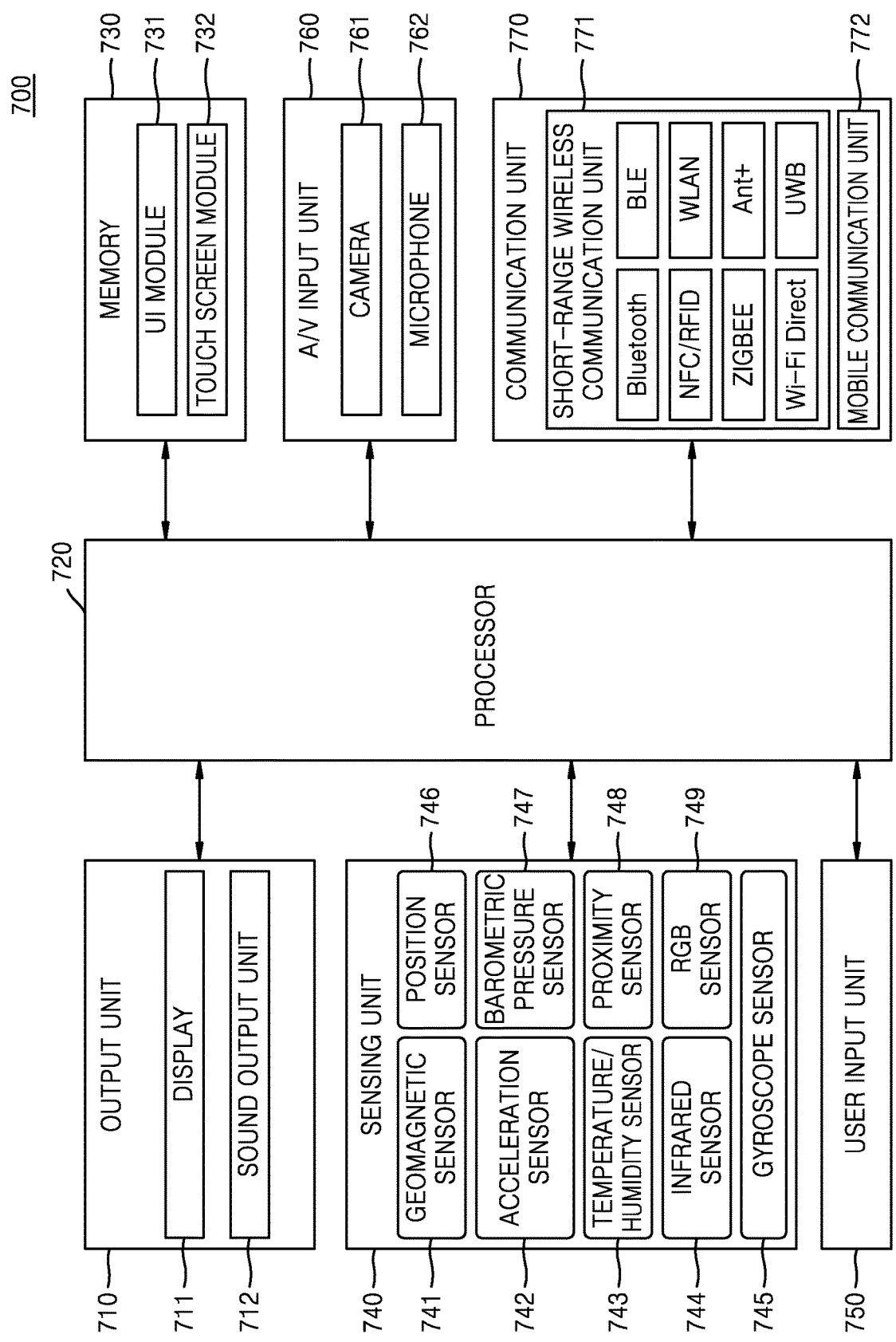

FIGS. 7 and 8 are each a block diagram of a device 700 for processing an image, according to an embodiment.

As shown in FIG. 7, the device 700 according to an embodiment may include an output unit 710, at least one processor 720, and a memory 730. However, not all the illustrated components are necessary components. The device 700 may be implemented by more components than the illustrated components, or the device 700 may also be implemented by less components than the illustrated components.

For example, as shown in FIG. 8, the device 700 according to an embodiment may further include a sensing unit 740, a user input unit 750, an audio/video (A/V) input unit 1060, and a communication unit 770 in addition to the output unit 710, the at least one processor 720, and the memory 730.

Hereinafter, the components set forth above will be described one by one.

The output unit 710 is for outputting audio signals or image signals and may include a display unit 711 and a sound output unit 712.

The display unit 711 displays and outputs information processed by the device 700. For example, the display unit 711 may output a plurality of blur compensation images generated by the at least one processor 720.

When the display unit 711 and a touch pad form a layer structure and thus constitute a touch screen, the display unit 711 may also be used as an input device in addition to being used as an output device. The display unit 711 may include at least one of a liquid crystal display, a thin film transistor-liquid crystal display, an organic light-emitting diode display, a flexible display, a 3-dimensional (3D) display, or an electrophoretic display. In addition, the device 700 may include two or more display units 711 according to an implementation type of the device 700. Here, the two or more display units 711 may be arranged to face each other by using a hinge.

The sound output unit 712 outputs audio data received from the communication unit 770 or stored in the memory 730. In addition, the sound output unit 712 outputs a sound signal related to a function (for example, a call signal receiving sound, a message receiving sound, or a notification sound) performed by the device 700. The sound output unit 712 may include a speaker, a buzzer, or the like.

The at least one processor 720 generally controls overall operations of the device 700. For example, the at least one processor 720 may take overall control of the output unit 710, the sensing unit 740, the user input unit 750, the A/V input unit 760, the communication unit 770, and the like by executing programs stored in the memory 730.

The at least one processor 720 may determine a cumulative value for an original image at a particular time point among a plurality of original images, the cumulative value being due to an overlap with an afterimage of another original image before the original image at the particular time point. In addition, the at least one processor 720 may obtain a plurality of blur compensation images for removing a blur caused by the afterimage, based on the determined cumulative value and the plurality of original images.

The at least one processor 720 according to an embodiment may determine the cumulative value, based on a value of at least one pixel constituting the plurality of original images and a blur kernel for the eye of a user. Here, the blur kernel may be determined based on a weight of each original image according to a response speed of visual cells of the user when the original image at the particular time point overlaps the previous original image.

The at least one processor 720 may determine the cumulative value representing the afterimage in the eye of the user, based on at least one of the movement of the head of the user or a degree of change in at least one object included in each of the plurality of original images.

In addition, the at least one processor 720 may determine the cumulative value, which represents the afterimage in the eye of the user, for the other original image before the original image at the particular time point, based on a result of tracking the movement of the eye.

The at least one processor 720 according to an embodiment may obtain a plurality of gamma correction images by performing gamma correction on each of the plurality of original images. In addition, the at least one processor 720 may determine the cumulative value, which represents the afterimage in the eye of the user, for the plurality of gamma correction images. Furthermore, the at least one processor 720 may obtain a plurality of de-gamma correction images by performing de-gamma correction on the obtained plurality of blur compensation images.

The memory 730 may store programs for processing and control performed by the at least one processor 720 and may store input/output data (for example, pixel values of images).

The memory 730 may include at least one of a flash memory type storage medium, a hard disk type storage medium, a multimedia card micro type storage medium, card type memory (for example, Secure Digital (SD) memory, eXtreme Digital (XD) memory, or the like), random access memory (RAM), static random access memory (SRAM), read-only memory (ROM), electrically erasable programmable read-only memory (EEPROM), programmable read-only memory (PROM), magnetic memory, a magnetic disk, or an optical disk. In addition, the device 700 may operate web storage or a cloud server, which performs a storage function of the memory 730, on the Internet.

The programs stored in the memory 730 may be classified into a plurality of modules, for example, a user interface (UI) module 731, a touch screen module 732, and the like, according to functions thereof.

The UI module 731 may provide a specialized UI, a graphics user interface (GUI), or the like interworking with the device 700, on an application basis. The touch screen module 732 may sense a touch gesture of the user on a touch screen and may transfer information about the touch gesture to the at least one processor 720. The touch screen module 732 according to an embodiment may recognize and analyze a touch code. The touch screen module 732 may be configured by separate hardware including a controller.

To sense a touch or a proximity touch with respect to the touch screen, various sensors may be arranged inside or near the touch screen. An example of a sensor for sensing a touch with respect to the touch screen includes a tactile sensor. The tactile sensor refers to a sensor sensing a contact with a particular object to an extent felt by a human or to a higher extent. The tactile sensor may sense various pieces of information, such as roughness of a contact surface, hardness of a contact object, and a temperature of a contact point.

In addition, an example of a sensor for sensing a touch with respect to the touch screen includes a proximity sensor.

The proximity sensor refers to a sensor detecting an object approaching a certain detection surface or the presence or not of an object in the vicinity thereof, without mechanical contact, by using force of an electromagnetic field or using an infrared ray. Examples of the proximity sensor include a transmission type photoelectric sensor, a direct reflection type photoelectric sensor, a mirror reflection type photoelectric sensor, a high-frequency oscillation type proximity sensor, a capacitive proximity sensor, a magnetic proximity sensor, an infrared proximity sensor, and the like. The touch gesture of the user may include tap, touch and hold, double tap, drag, panning, flick, drag and drop, swipe, or the like.

The sensing unit 740 may sense at least one of a state of the device 700, a state around the device 700, or a state of the user wearing the device 700 and may transfer sensed information to the at least one processor 720.

The sensing unit 740 according to an embodiment may track the movement of the user wearing the device 700. For example, the sensing unit 740 may measure the movement of the head of the user wearing the device 700. In addition, the sensing unit 740 may track the movement of the eye of the user.

The sensing unit 740 may include, but is not limited to, at least one of a geomagnetic sensor 741, an acceleration sensor 742, a temperature/humidity sensor 743, an infrared sensor 744, a gyroscope sensor 745, a position sensor (for example, a GPS) 746, a barometric pressure sensor 747, a proximity sensor 748, or an RGB sensor (illuminance sensor) 749. Because a function of each sensor may be intuitively inferred from the name thereof by one of ordinary skill in the art, descriptions thereof will be omitted.

The user input unit 750 refers to a means for the user to input data for controlling the device 700. For example, the user input unit 1100 may include, but is not limited to, a key pad, a dome switch, a touch pad (a touch capacitive type, a pressure resistive type, an infrared beam sensing type, a surface acoustic wave type, an integral strain gauge type, a piezoelectric type, or the like), a jog wheel, a jog switch, or the like.

The user input unit 750 may receive a user input. In addition, the user input unit 750 may receive a user input selecting at least one of items displayed on a sensing region of each of a plurality of sensors, by interworking with the UI module 731. However, this is merely an example, and the type of the user input received by the user input unit 750 is not limited to the example set forth above.

The A/V input unit 760 is for inputting an audio signal or a video signal and may include a camera 761, a microphone 762, and the like. The camera 761 may obtain an image frame of a still image, a moving image, or the like through an image sensor in a video call mode or a shooting mode. An image captured through the image sensor may be processed by the at least one processor 720 or a separate image processing unit (not shown).

The image frame processed by the camera 761 may be stored in the memory 730 or may be transmitted to the outside of the device 700 through the communication unit 770. Two or more cameras 761 may be provided according to a configuration of the device 700.

The microphone 762 receives an external sound signal that is input thereto and processes the sound signal into electrical sound data. For example, the microphone 762 may receive a sound signal from an external device or a speaker. The microphone 762 may use various noise cancelling algorithms for removing noise generated during the reception of the external sound signal.

The device 700 according to an embodiment may further include a lens (not shown). The user of the device 700 may sense an image that is output from the display unit 711, through the lens.

The communication unit 770 may include at least one component allowing communication between the device 700 and an external device (for example, a head-mounted display (HMD)). For example, the communication unit 770 may include a short-range wireless communication unit 771 and a mobile communication unit 772.

The short-range wireless communication unit 771 may include, but is not limited to, a Bluetooth communication unit, a Bluetooth Low Energy (BLE) communication unit, a near field communication unit, a wireless local area network (WLAN) (Wi-Fi) communication unit, a Zigbee communication unit, an Infrared Data Association (IrDA) communication unit, a Wi-Fi Direct (WFD) communication unit, an ultra wideband (UWB) communication unit, an Ant+ communication unit, or the like.

The mobile communication unit 772 transmits a radio signal to and receives a radio signal from at least one of a base station, an external terminal, or a server on a mobile communication network. Here, the radio signal may include various types of data according to transmission and reception of a voice call signal, a video call signal, or a text/multimedia message.

The method according to an embodiment of the present disclosure may be implemented in the form of program instructions that may be performed by various computer means and thus may be recorded on a computer-readable medium. The computer-readable medium may include program instructions, data files, data structures, or the like, alone or in combination. The program instructions recorded on the computer-readable medium may be designed and configured specially for the present disclosure or may be known to and used by those of ordinary skill in the art. Examples of the computer-readable medium may include magnetic media such as a hard disk, a floppy disk, and magnetic tape, optical media such as CD-ROM and a digital versatile disk (DVD), magneto-optical media such as a floptical disk, and hardware devices such as ROM, RAM, and flash memory, which are specially configured to store and execute the program instructions. Examples of the program instructions include machine language codes such as those made by a compiler, and high-level language codes executable by a computer by using an interpreter or the like.

Heretofore, while the embodiments of the present disclosure have been described in detail, the scope of the present disclosure is not limited thereto, and it should be understood that various changes and modifications, which may be made by those of ordinary skill in the art based on the basic principles of the present disclosure as defined in the appended claims, also fall in the scope of the present disclosure.

The invention claimed is:

1. A method, performed by a device, of processing an image, the method comprising:
for an original image at a particular time point among a plurality of original images having a sequential relationship in terms of time, in case that the original image overlaps other original images, determining a weight of each of the plurality of original images according to a response speed of visual cells of a user to an afterimage;
determining a blur kernel for an eye of the user to the afterimage based on the weight of each of the plurality of original images;
determining a cumulative value due to the afterimage of the other original images before the particular time point based on a value of at least one pixel constituting the plurality of original images and on the blur kernel;
based on the determined cumulative value and the plurality of original images, obtaining a plurality of blur compensation images for removing a blur caused by the afterimage; and
outputting the obtained plurality of blur compensation images,
wherein a signal perceived by a user by the afterimage generated according to outputting of the plurality of blur compensation images corresponds to an ideal perception signal of an image removed the blur caused by the afterimage.

2. The method of claim 1, wherein the determining of the cumulative value comprises determining the cumulative value representing the afterimage in the eye of the user, based on at least one of a movement of a head of the user wearing the device or a degree of change in at least one object comprised in each of the plurality of original images.

3. The method of claim 1, further comprising tracking a movement of the eye of the user,
wherein the determining of the cumulative value comprises determining the cumulative value due to the afterimage of the other original images before the particular time point, based on a result of the tracking of the movement of the eye.

4. The method of claim 1, wherein the plurality of blur compensation images are obtained based on differences between the determined cumulative value and the plurality of original images.

5. The method of claim 1, further comprising:
obtaining a plurality of gamma correction images by performing gamma correction on each of the plurality of original images; and
obtaining a plurality of de-gamma correction images by performing de-gamma correction on the obtained plurality of blur compensation images,
wherein the determining of the cumulative value comprises, for the plurality of gamma correction images, determining the cumulative value due to the afterimage.

6. A non-transitory computer-readable recording medium, on which a program for performing, by a computer, the method of claim 1.

7. A device for processing an image, the device comprising:
a memory storing a plurality of original images having a sequential relationship in terms of time;
at least one processor configured to:
for an original image at a particular time point among the plurality of original images, in case that the original image overlaps other original images, determine a weight of each of the plurality of original images according to a response speed of visual cells of a user to an afterimage,
determine a blur kernel for an eye of the user to the afterimage based on the weight of each of the plurality of original images,
determine a cumulative value due to the afterimage of the other original images before the particular time point based on a value of at least one pixel constituting the plurality of original images and on the blur kernel, and
based on the determined cumulative value and the plurality of original images, obtain a plurality of blur compensation images for removing a blur caused by the afterimage; and
an output unit outputting the obtained plurality of blur compensation images,
wherein a signal perceived by the user by the afterimage generated according to outputting of the plurality of blur compensation images corresponds to an ideal perception signal of an image removed the blur caused by the afterimage.

8. The device of claim 7, wherein the at least one processor is configured to determine the cumulative value representing the afterimage in the eye of the user, based on at least one of a movement of a head of the user wearing the device or a degree of change in at least one object comprised in each of the plurality of original images.

9. The device of claim 7, further comprising a sensing unit configured to track a movement of the eye of the user,
wherein the at least one processor is configured to determine the cumulative value due to the afterimage of the other original images before the particular time point, based on a result of the tracking of movement of the eye.

10. The device of claim 7, wherein the plurality of blur compensation images are obtained based on differences between the determined cumulative value and the plurality of original images.

11. The device of claim 7, wherein the at least one processor is further configured to:
obtain a plurality of gamma correction images by performing gamma correction on each of the plurality of original images; for the plurality of gamma correction images,
determine the cumulative value due to the afterimage; and
obtain a plurality of de-gamma correction images by performing de-gamma correction on the obtained plurality of blur compensation images.

* * * * *